United States Patent
Farrell et al.

(10) Patent No.: US 12,151,692 B2
(45) Date of Patent: Nov. 26, 2024

(54) PERFORMANCE TUNING FOR ELECTRONIC CONTROL UNIT

(71) Applicant: GM GLOBAL TECHNOLOGY OPERATIONS LLC, Detroit, MI (US)

(72) Inventors: Brian Farrell, Troy, MI (US); Joseph E. Ploucha, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/847,812

(22) Filed: Jun. 23, 2022

(65) Prior Publication Data

US 2023/0415754 A1 Dec. 28, 2023

(51) Int. Cl.
*B60W 50/02* (2012.01)
*B60W 50/00* (2006.01)

(52) U.S. Cl.
CPC .... *B60W 50/0205* (2013.01); *B60W 50/0225* (2013.01); *B60W 2050/0083* (2013.01); *B60W 2050/021* (2013.01)

(58) Field of Classification Search
CPC ................................................ B60W 50/0205
See application file for complete search history.

(56) References Cited

U.S. PATENT DOCUMENTS

| | | | |
|---|---|---|---|
| 8,881,308 B2* | 11/2014 | Baltes | G06F 21/64 717/124 |
| 10,038,565 B2 | 7/2018 | Alrabady et al. | |
| 2014/0075579 A1* | 3/2014 | Baltes | G06F 21/51 726/30 |

OTHER PUBLICATIONS

Serial number. In: Wikipedia, the free encyclopedia. Bearbeitungsstand: Mar. 26, 2022. URL: https://en.wikipedia.org/w/index.php?title=Serial_number&oldid=1079399855 [abgerufen am Jan. 31, 2023].

Message authentication code. In: Wikipedia, the free encyclopedia. Bearbeitungsstand: May 31, 2022. URL: https://en.wikipedia.org/w/index.php? title=Message_authentication_code&oldid=1090837135 [abgerufen am Jan. 31, 2023].

* cited by examiner

*Primary Examiner* — Shelley Chen
(74) *Attorney, Agent, or Firm* — Quinn IP Law

(57) ABSTRACT

A method for performance tuning an electronic control unit (ECU). The performance tuning may include determining one or more tunable values stored on a tunable implementation memory of the ECU to specify tunable calibration data for one or more tunable calibration parameters selected for performance tuning and controlling an application software of the ECU to execute according to the tunable calibration data.

17 Claims, 5 Drawing Sheets

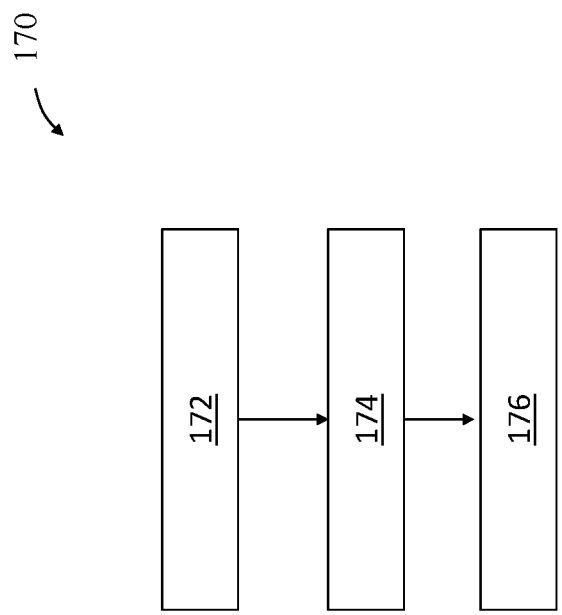

PERFORMANCE TUNING FOR ELECTRONIC CONTROL UNIT

INTRODUCTION

The present disclosure relates to adjusting programming of an electronic control unit (ECU), such as to facilitate adjusting calibratable values of the ECU for purposes of performance tuning related operation of the ECU.

An electronic control unit (ECU) may be considered as a computer, a microcontroller, or other processing element configured to provide or otherwise support one or more operations, functions, processes, etc., such as by outputting corresponding signals, data, controls, and the like to a dependent system. By way of example, when employed with a host device, such as an automobile, various ECUs may be used as an engine control module (ECM), a telematics unit (TU), a powertrain control module (PCM), a transmission control module (TCM), a brake control module (BCM), a central control module (CCM), a central timing module (CTM), a passenger door module (PDM), a system control module (SCM), an airbag control module (ACM), a battery management system (BMS), a general electronic module (GEM), a body control module (BCM), a suspension control module (SCM), and more.

ECUs may be provided from a supplier for installation at a factory of an original equipment manufacturer (OEM), such as by installing the ECUs as part of an assembly line used to assemble an automobile. At the time of factory installation, ECUs may be programmed with an initial set of values configured to calibrate operations of the ECU according to nominal design parameters. This initial set of values may be considered as factory settings or factory values due to the related calibration of the ECU being set at the time of the host device leaving the factory. Because the devices having ECUs may be used in any number of environments, in any number of unpredictable ways, and/or for any number of purposes, some users may wish to make alterations to the factory settings or values of the ECUs in order to tailor the attendant calibration according to their particular interests.

The altering of factory calibration settings and/or values of an ECU with non-OEM generated values, optionally after the host device leaves the factory, may be considered as performance tuning. The performance tuning, for example, may occur when alterations are implemented by a purchaser of the device according to their particular interests and needs, which may in some cases be contrary to a typically more generic factory calibration of the ECU. As opposed to the factory calibration relying upon median values, for example, a purchaser may wish to performance tune the calibration to values that are farther way from the median, such as with the use of more extreme calibration values. While the OEM of the device and/or the ECU may wish to enable this type of performance tuning for their customers, the customers may lack the requisite understanding or capabilities for selecting suitable calibration values. Even when individuals may have the requisite expertise, they may nonetheless lack the overall awareness of how to properly adjustment the calibratable values to account for corresponding influences on the host device and/or other dependent systems.

SUMMARY

One non-limiting aspect of the present disclosure contemplates programming of an electronic control unit (ECU), such as to facilitate performance tuning. The performance tuning may include an end user or other individual being provided with capabilities to adjust calibratable values of the ECU. The performance tuning may include constraints and limits on the degree or range of permissible variations in the calibratable values. These limits may be selected in an effort to assure any resulting operational influence on the host device and/or other dependent system are within adequate design parameters, e.g., to constrain the performance tuning according to suitable operational limits.

Disclosed herein is a method for performance tuning an electronic control unit (ECU). The method may include determining one or more tunable values stored on a tunable implementation memory of the ECU where the tunable values specify tunable calibration data for performance tuning. The method may further include determining the tunable values and a granular security control adjustment authorization ticket (G-SCAAT) stored on the ECU to each be one of valid and invalid. The method yet further include controlling an application software of the ECU to execute according to the tunable calibration data stored on the tunable implementation memory if both of the tunable values and the G-SCAAT are valid, else controlling the application software to execute independently of the tunable calibration data and according to factory calibration data stored on a calibration memory of the ECU.

The method may include determining the tunable values be valid if within limits specified in a tunable constraint memory of the ECU, else determining the tunable values to be invalid.

The method may include determining the tunable values as a function of information input to a programming tool whereby the programming tool may be configured to interface the ECU with a user and store the tunable values on the tunable implementation memory.

The method may include transmitting a negative response code (NRC) from the ECU to the programming tool when the tunable values are determined to be invalid.

The method may include selecting the tunable calibration data available for the performance tuning according one or more entitlements specified in the G-SCAAT.

The method may include determining the G-SCAAT to be invalid in response to the G-SCAAT expiring and/or having been erased.

The method may include determining the G-SCAAT to be invalid in response to an option bit included as a part of the G-SCAAT being set to a first value.

The method may include determining the G-SCAAT to be invalid in response to a G-SCAAT creation count included as part of the G-SCAAT failing to be greater than a back office creation count transmitted from a back office to the ECU. The G-SCAAT creation count may be a free running value.

The method may include determining the G-SCAAT to be invalid in response to a G-SCAAT expiration count included as part of the G-SCAAT failing to be less than a back office expiration count transmitted from a back office to the ECU. The G-SCAAT expiration count may be a predefined value.

The method may include determining the G-SCAAT to be invalid in response to a manufacturing enable counter (MEC) of the ECU being zero and an option bit included as part of the G-SCAAT being set to a second value.

The method may include determining the G-SCAAT to be invalid in response to a manufacturing enable counter (MEC) of the ECU being greater than zero and an option bit being set to a third value.

The method may include determining the G-SCAAT to be invalid in response to a G-SCAAT ignition count included as part of the G-SCAAT being greater than zero and an ECU ignition count of the ECU being 0.

The method may include determining the G-SCAAT to be invalid in response to a Not Before Identifier (NBID) included as part of the G-SCAAT being greater than an ECU NBID of the ECU.

The method may include determining the G-SCAAT to be invalid in response to an ECU message authentication code (MAC) failing to match a G-SCAAT MAC. The ECU may generate the ECU MAC by signing the G-SCAAT with a shared secret. A back office and generate the G-SCAAT MAC by signing the G-SCAAT with the shared secret.

The method may include bypassing an authenticity check to program the tunable values for storage on the tunable implementation memory. The authenticity check may be required to change or re-program the factory calibration data stored on the calibration memory.

Disclosed herein is a method for performance tuning an electronic control unit (ECU). The method may include determining one or more tunable values stored on a tunable implementation memory of the ECU. The method may further include determining the tunable values to be valid if within limits specified in a tunable constraint memory of the ECU, else determining the tunable values to be invalid. The method may get further include controlling an application software of the ECU to execute according to the tunable values if the tunable values are valid, else controlling the application software to execute independently of the tunable values according to factory values stored on a calibration memory of the ECU.

The method may include comprising selecting the tunable values made available for the performance tuning according one or more entitlements specified in a granular security control adjustment authorization ticket (G-SCAAT) stored on the ECU.

The method may include determining the tunable values as a function of information input to a programming tool, the programming tool configured to interface the ECU with a user.

Disclosed herein is a method for performance tuning an electronic control unit (ECU). The method may include selecting one or more partitions of a tunable implementation memory of the ECU to receive tunable values for performance tuning. The partitions may be selected according to entitlements specified in a granular security control adjustment authorization ticket (G-SCAAT) installed on the ECU. The method may further include controlling an application software of the ECU to execute according to the tunable values if both of the tunable values and the G-SCAAT are valid, else controlling the application software to execute independently of the tunable values.

The method may include determining the tunable values to be valid if within limits specified in a tunable constraint memory of the ECU, else determining the tunable values to be invalid.

The above features and advantages along with other features and advantages of the present teachings are readily apparent from the following detailed description of the modes for carrying out the present teachings when taken in connection with the accompanying drawings. It should be understood that even though the following Figures embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 6 illustrates a flowchart for a third validation process in accordance with one non-limiting aspect of the present disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
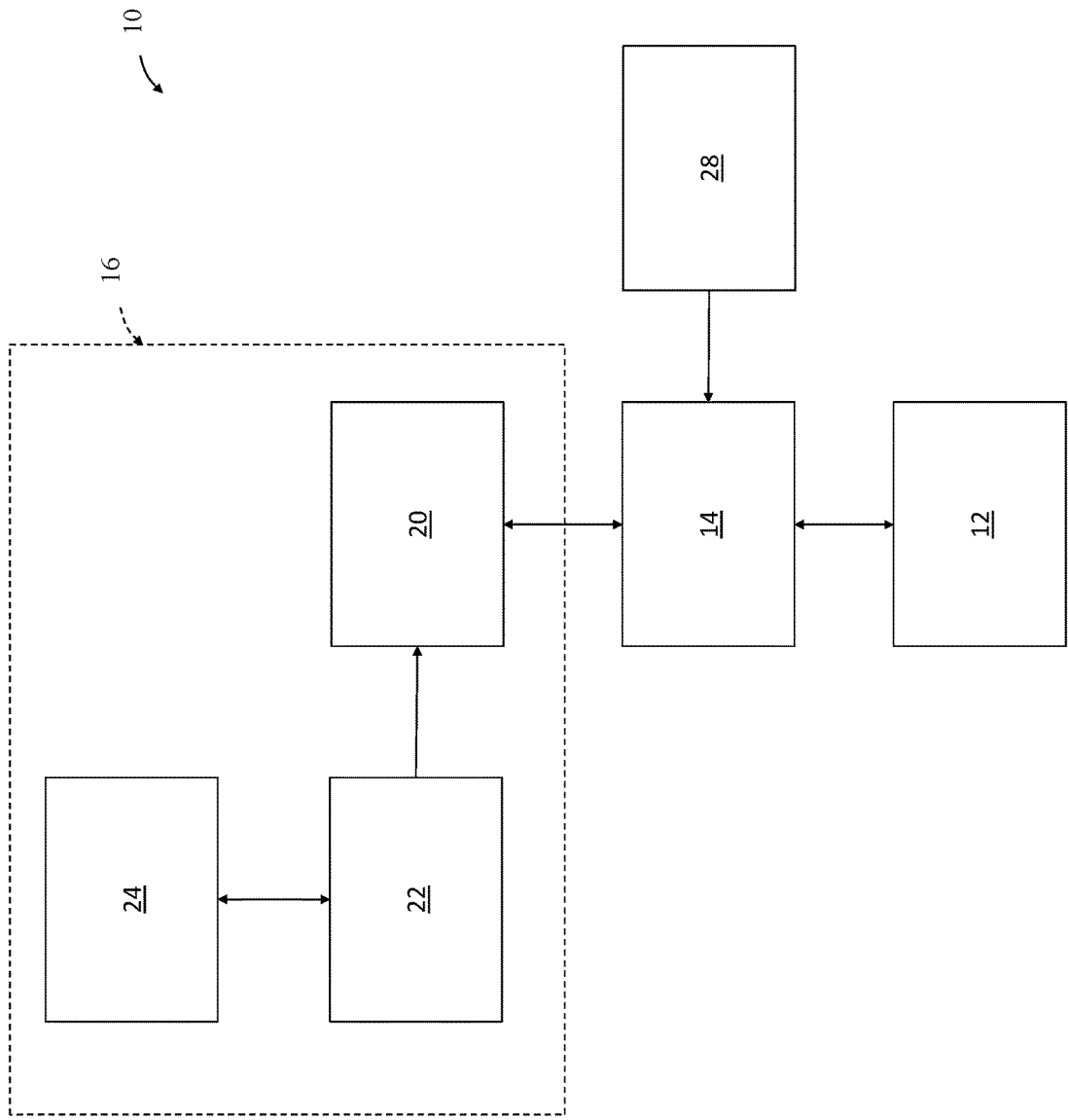
FIG. 1 is a functional diagram of a system configured for performance tuning in accordance with one non-limiting aspect of the present disclosure.

FIG. 1 is a functional diagram of a system 10 configured for performance tuning in accordance with one non-limiting aspect of the present disclosure. The system 10 is predominantly described with respect to facilitating performance tuning for an electronic control unit (ECU) 12 included on an automobile (host device) for exemplary purposes as the present disclosure fully contemplates its use and application in performance tuning devices other than ECUs 12 as well as ECUs 12 included within devices other than automobiles. The system 10 may operate according to interactions between a programming tool 14, a back office 16, and the ECU 12, whereby each cooperates to facilitate performance tuning according to the processes and methodologies contemplated herein. Each may include a processor configured for executing non-transitory instructions stored on an included memory to facilitate the various operations, functions, and activities described herein, and likewise, each may include suitable interfaces, connections, communication capabilities, etc. needed to implement the processes and operations contemplated herein.

The back office 16 may be considered as a trusted authority, such as one under the control or direction of an original equipment manufacturer (OEM) of the host device or another entity tasked with validating soft parts for update and/or generating granular security control adjustment authorization tickets (G-SCAATs) 20 to facilitate performance tuning. The back office 16 may include a database 22 capable of storing and cross-referencing G-SCAATs 20, soft parts, software installations, etc. with ECU identifiers (IDs) such that the back office 16 may effectively maintain an up-to-date version of each G-SCAAT 20 authorized for each ECU 12. Each G-SCAAT 20 may be comprised of or otherwise associated with ECU IDs, module IDs, part numbers etc. to coordinate the use thereof with files, datasets, or other content having the software, code, programming, etc. The G-SCAATs 20 may be programmed into the ECUs 12 with a corresponding file or structure capable of being transmitted to and acted upon by the ECU 12 to facilitate the performance tuning contemplated herein. The back office 16 may include a portal 24 or other interface, e.g., website, configured to receive request messages from purchasers or other individuals, and based thereon, such as according to included credentials, selecting roles and/or other constraints for defining and assigning a G-SCAAT 20 to the requesting user.

The programming tool 14 may interact with the back office 16 to facilitate performance tuning of the ECU 12 according to permissions, entitlements, and other constraints defined in a corresponding one of the G-SCAATs 20. The programming tool 14 may correspond with a device having capabilities sufficient to interact with the ECU 12. The programming tool 14, for example, may correspond with a standalone tester capable of being connected to a network or directly to the ECU 12. The tester, in the case of a vehicle, may connect to a vehicle network in communication with the ECU 12, and/or the tester may plug directly into a receptable or interface of the ECU 12. The programming tool 14, optionally instead of being an independent tester, may be included within a module or another ECU, e.g., one ECU may act as a programming tool for another ECU. The programming tool 14 may also be located remotely from the device having the ECU 12, such as to facilitate wireless or over-the-air (OTA) updates. The programming tool 14 may include a user interface or a human-machine-interface (HMI) to facilitate interacting with an administrator when needed for entering information and commands associated with user dependent aspects of facilitating an update.

The programming tool 14 may be a generic item or non-specific to the ECU 12 or the host device insofar as it may require information, files, and other data to be loaded thereon. The back office 16, for example, may provide the programming tool 14 with a utility file having the G-SCAAT 20 and/or other information to be loaded or otherwise programmed onto the ECU 12. The utility file 28 may include a copy of the software, calibration tables, coding, etc. associated with the G-SCAATs 20 and/or other data sets to be provided to the ECU 12 to facilitate the performance tuning contemplated herein. The utility file 28 may be stored on the programming tool 14 or otherwise provided thereto, such as from the back office 16 through wired or wireless communications. One aspect of the present disclosure contemplates the programming tool 14 being utilized by vehicle technicians or owners while working on the host device. The need to have a separate programming tool 14 or to pre-load the programming tool 14, of course, may not be desired, particularly as the scope of wireless communications increase, such that some or all the interactions described herein may occur directly between the back office 16 and the ECU 12 through wired or wireless signaling.

Figure 2:
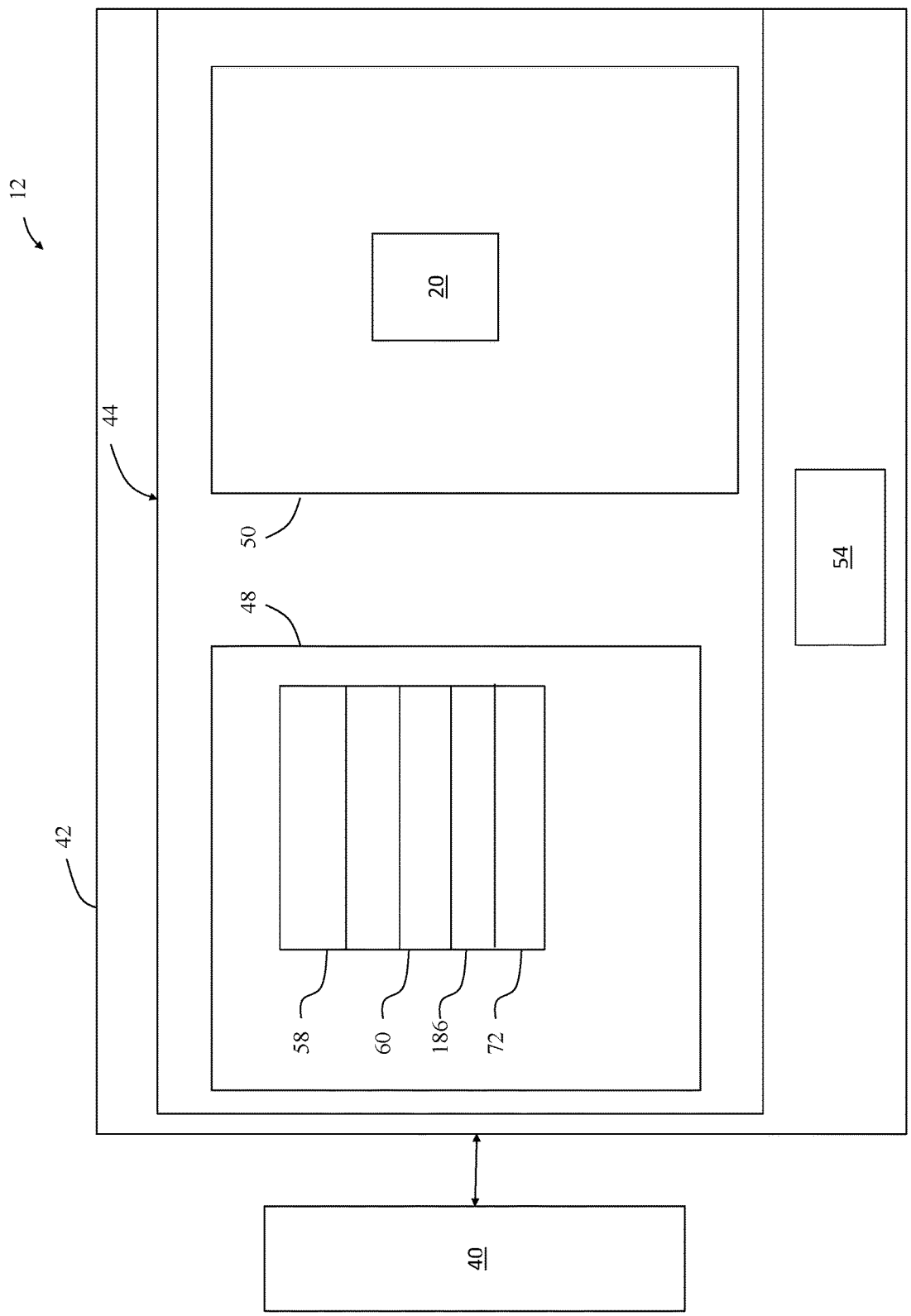
FIG. 2 illustrates a functional diagram of an electronic control unit (ECU) in accordance with one non-limiting aspect of the present disclosure.

FIG. 2 illustrates a functional diagram of the ECU 12 in accordance with one non-limiting aspect of the present disclosure. The ECU 12 may include an interface 40 configured to facilitate exchanging signals, messages, etc. with the programming tool 14, the back office 16, and/or dependent systems. The interface 40 may include corresponding features configured to facilitate the attendant communications, including componentry sufficient to facilitate wired and/or wireless exchanges. The ECU 12 may include a processor 42 configured to control the ECU 12 according to execution of non-transitory instructions stored on an included computer-readable storage medium 44. The storage medium 44 is shown for exemplary, non-limiting purposes as being divided into a normal zone 48 and a secured zone 50. The normal zone 48 may correspond with volatile and/or non-volatile memory configured to permit data stored thereon to be updated, erased, or otherwise manipulated, optionally dependent upon whether the corresponding actor has met certain security protocols. The secured zone 50 may run firmware and support data storage which may be configured such that firmware and data stored thereon in volatile and/or non-volatile memory may be permanent and/or effectively incapable of being directly changed from external functions or sources.

One non-limiting aspect of the present disclosure contemplates the ECU 12 including a bootloader, a boot manager, a bootstrap loader, a control program, or other construct 54 to facilitate loading or otherwise preparing the ECU 12 for operation. The bootloader 54 may be configured to execute upon power up or other initialization of the ECU 12 for purposes of instantiating an application software stored on an application memory 58. The application software may be configured to control operations of the ECU 12. The bootloader 54 may include control software and/or other control logic configured to facilitate controlling instantiation of application software and/or for performing other operations contemplated or needed to enable the performance tuning described herein. The bootloader 54, accordingly, is presented in a non-limiting manner to represent a functional feature of the ECU 12 configured to facilitate the operations envisaged herein. The bootloader 54 may be considered to operate separately from the application software in the sense that it may be used to facilitate the operations contemplated herein for performance tuning of the application software as well as for directing other operations needed to control the ECU 12 according to commands of the application software.

The application software, for example, may be configured to facilitate controlling dependent systems, performing calculations, or otherwise executing processes assigned to the ECU 12. The ECU 12 may be configured to perform a number of controls, particularly when included within an automobile, whereby the corresponding control may be generated according to algorithms, programming, logic, etc. included within the application software facilitating related management of the ECU 12. The application software may be stored on the normal memory 48 within a range of memory partitions separately identifiable according to one or more module IDs configured to logically identify associated clusters of memory partitions. The module IDs, i.e., the portions of the normal memory 48 including the application software, may be used to represent the application memory portion 58 of the memory 44, or portion of the normal memory 48 actively configured to facilitate the application software. One non-limiting aspect of the present disclosure contemplates at last some of the ECU operations executed at the direction of the application software being based at least in part upon calibration data.

The calibration data may be stored in a calibration memory 60 as a plurality of values set for a corresponding plurality of calibration parameters associated with various aspects of the application software, i.e., associated with values being used for different calculations, logic, controls, etc. to be undertaken with the ECU 12. One or more of the calibration parameters may be calibratable in the sense that values used to define the influence thereof may be adjustable from one value to another value in order to induce a resulting influence on the application software. The calibration data may correspondingly be defined as a plurality of calibration parameters having one or more calibratable values capable of being set to induce a corresponding influence over the execution of the application software. The calibration data, or more particularly the values used to represent the influence thereof, may take various forms and be provided according to various structures, such as in the form of tables, alphanumeric characters, programming/language, etc.

The calibratable values, at least with respect to performance tuning, can be changed from one value to another value or from one datum to another datum for purposes of inducing a corresponding influence on a related operation of the application software. One non-limiting aspect of the present disclosure contemplates enabling a purchaser, an owner, or another entity, such as an over-the-air (OTA) server at the back office, to undertake performance tuning of this type whereby the performance tuning may be characterized as changing one or more of the calibratable values from one value to another value. This performance tuning, i.e., changing of the calibration values from one value to another, may require programming or otherwise writing over a portion of the memory 48 having the previously stored value(s). The programming may be facilitated with the bootloader 54 or control software associated with the bootloader 54. The bootloader 54, for the sake of explanation, may be configured to control adding and removing data to the memory 44 according to the security protocols associated with the related memory, and thereafter, initializing the ECU 12 to act accordingly.

The bootloader 54 may require an authenticity check before permitting changes to the data, calibratable values, etc. stored on the memory 44. The authenticity check may correspond with a verification process whereby a digital signature for the data, software, etc. to be added and/or changed may be verified before permitting storage on the ECU 12. The authenticity check may require signing and verifying an entirety of the code, software, data, etc. with a digitally signature before permitting its storage on the ECU 12. In the case of making changes to the application software and/or the calibration data, the authenticity check may require changes to be digitally signed and that the entire set of code relying upon thereupon also be digitally signed and verified, e.g., compiled after each change. The repeated signing and verifying of such ECU updates can be cumbersome and time consuming, particularly when developing, testing, or troubleshooting updates for use with the ECU 12. The authentication check, for example, may require an administrator to undertake laborious processes for generating and then verifying digital signatures each time any sort of change is desired, no matter how small, which can be especially onerous when the administrator may be required to repeatedly test different value combinations before arriving at a suitable combination of values.

One non-limiting aspect of the present disclosure contemplates the bootloader 54 being configured to perform a bypass operation to circumvent the authenticity check under certain circumstances. When implemented, the bypass operation may correspond with the bootloader 54 permitting selectable partitions or portions of the memory to be programmed, change, adjusted, etc. without requiring the changes, memory, partitions, or the corresponding software, file, etc. to be to be digitally signed and/or verified. The bypass operation, instead, may be used to permit a user to make changes to certain portions of the memory 44 without requiring corresponding digital signatures of all the affected software or coding. This can be beneficial in allowing an operator to perform trial and test processes (performance tuning) whereby the calibration parameters can be incrementally altered and tested without having to undertake the more burdensome processes of the authenticity check. The bypass operation may enable the bootloader 54 to interact with the programming tool 14, such as to receive the calibratable values or otherwise tune the calibration data, and thereafter program those values into the memory 48 for purposes of inducing corresponding changes in the operation of the application software. The bootloader 54 may be configured to compile or otherwise process the calibration values for storage on the calibration memory and thereafter instruct the application software to commence processing.

The circumstances suitable to the bypass operation may be defined within permission or entitlements associated with the G-SCAAT 20. The G-SCAAT 20 may be loaded and installed on the ECU 12, optionally following an unlock or other security measure. The unlock, for example, may corresponding with a Unified Diagnostic Services (UDS) or other suitable diagnostic communication protocol configured to unlock the ECU according to a seed-based request-response strategy, e.g., utilizing a service identifier (SID) security access associated with request SID 0x27 and response SID 0x67 of the UDS. This strategy may provide an authentication process whereby the ECU 12 generates and transmits a seed to the programming tool 14 that the programming tool 14 then responsively uses to generate and transmit a key back to the ECU 12, optionally with the programming tool 14 exchanging related messaging with the back office 16. The ECU 12 may then authenticate the programming tool 14 to load the G-SCAAT 20 and/or make updates to the ECU 12 depending on whether use of a responsive cryptographic key matches the associated key of the ECU 12. Further security measures, such as requiring the back office 16 to provide additional authentication data and/or the use of message authentication codes (MACs) may also be utilized alone and/or in combination with the seed-based request-response to facilitate unlocking the ECU 12 for installation of the G-SCAAT 20.

The G-SCAAT 20, once stored on the memory 50, may be used in cooperation with the bootloader 54 to facilitate instantiating the ECU 12 and the application software at startup, and otherwise controlling the ECU 12 from power up until the application software commences. The G-SCAAT 20 may be a static file, such as one constructed of plain text, that the bootloader 54 may be configured to automatically process whenever the ECU 12 is being powered on. This may occur in response to host device and/or the ECU 12 being correspondingly transitioned from one state to another, which for example may coincide with ignition events of an automobile. The G-SCAAT 20, at least in this manner, may be configured to adjust operations of the bootloader 54 whenever the G-SCAAT 20 is installed on the ECU 12. The bootloader 54 may optionally check a signature of the G-SCAAT 20 or perform another type of verification on the G-SCAAT 20 before installing or otherwise acting according to information stored therein. The bootloader 54 may also optionally include logic or other measures for ascertaining whether to initiate the application software according to the influences of the G-SCAAT 20 or whether it should instead ignore the G-SCAAT 20 and execute without its influence, such as according to previously defined factory settings.

Figure 3:
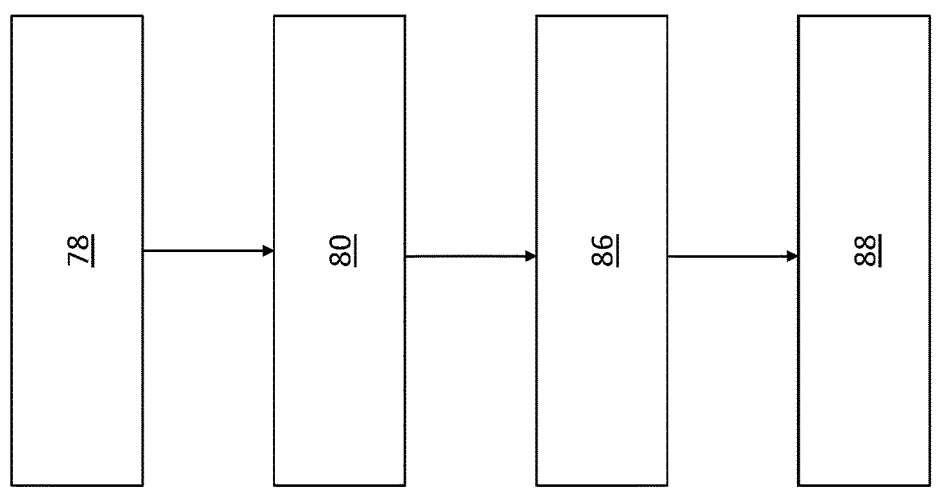
FIG. 3 illustrates a flowchart of a method for performance tuning in accordance with one non-limiting aspect of the present disclosure.

FIG. 3 illustrates a flowchart 70 of a method for performance tuning in accordance with one non-limiting aspect of the present disclosure. The method may be bodied, at least partially, within corresponding non-transitory instructions stored for execution at the back office 16, programming tool 14, and/or ECU 12, or other entity in communication therewith. The method is described for exemplary purposes with respect to performance tuning of the ECU 12 as the present disclosure fully contemplates its use and application of facilitating performance tuning of other types of devices. The performance tuning is also predominantly described for exemplary purposes with respect to the performance tuning relying upon changing one or more values stored in a tunable implementation memory 72 (FIG. 2) of the ECU 12. The tunable values stored in the implementation memory 72 may be configured for use with the application software in addition to or in place of the values in the calibration memory 60 to facilitate controlling operation of an ECU 12.

The flowchart 70 illustrates the method including a plurality of blocks 78, 80, 86 associated with a corresponding plurality of validation processes configured for validating the G-SCAAT 20 and a block 88 associated with performance tuning the ECU 12, optionally following a determination of G-SCAAT 20 validity. While the present disclosure fully contemplates assessing G-SCAAT validity according to any number of other processes and operations, the illustrated grouping of validity tests 78, 80, 86 may be beneficial in enabling one or more of the validation processes to be omitted and/or performed separately. The illustrated grouping 78, 80, 86, in other words, may be used to enable a user of the G-SCAAT 20 to identify pass-fail portions of the validity process depending on when the invalidity determination is made. The illustrated grouping 78, 80, 86 is presented for non-limiting purposes as the present disclosure fully contemplates including more or less of the invalidity test and performing the invalidity tests according to different sequences and operations.

Figure 4:
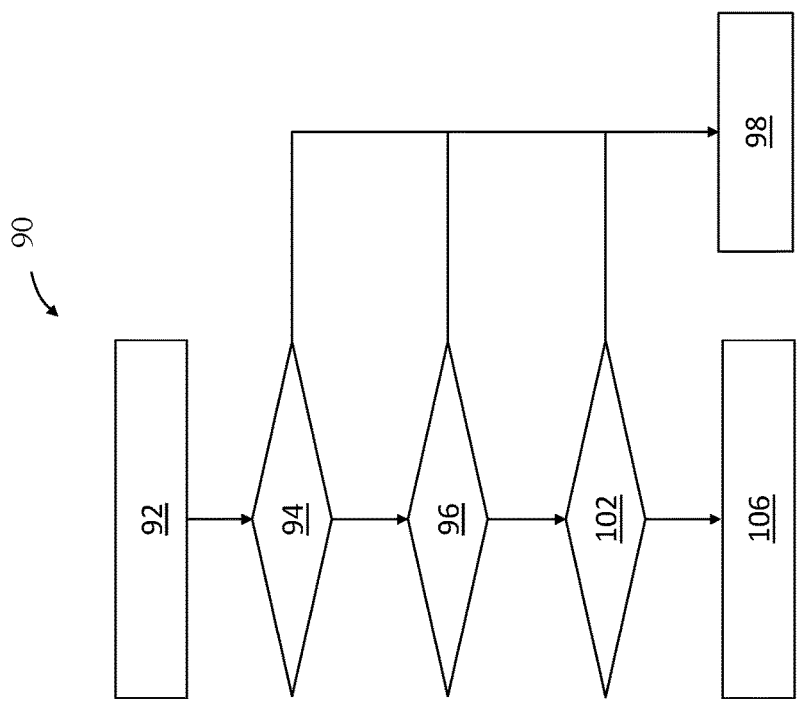
FIG. 4 illustrates a flowchart for a first validation process in accordance with one non-limiting aspect of the present disclosure.

FIG. 4 illustrates a flowchart 90 for the first validation process 78. Block 92 relates to powering or other type of initialization processes associated with starting the ECU 12, such as an ignition event whereby an automobile having the ECU 12 is activated. The initialization process 92 may correspond with the bootloader 54 and other control software included as part of the ECU 12 preparing the ECU 12 to execute according to the application software. The initialization process 92 may include acting according to permissions, instructions, entitlements, etc. included within the G-SCAAT 20, and as such, the initialization process 92 may occur after an unlock or other processes associated with loading the G-SCAAT into the ECU memory 44. The initialization process 92 may include setting a G-SCAAT status, unlock levels, and SBI security initially to invalid, default, null, or other primary values. These initial settings may be used to prevent the bootloader 54 from acting according to the G-SCAAT 20 for purposes of performance tuning until the G-SCAAT status is changed to valid and/or until certain security unlocks and controls are set. The bootloader 54 may be configured to ignore or disregard the G-SCAAT 20 until the G-SCAAT status is set to valid, and in the event the G-SCAAT has been erased to removed, to automatically maintain the G-SCAAT status as invalid.

Block 94 relates to a boot/software compatibility ID (BCID) process associated with checking whether a BCID for the G-SCAAT 20 is stored on the ECU 12 and whether the BCID set to a default value. The bootloader 54 may use a digitally signed parameter provided during a programming session as a pre-check to verify if the application software is compatible with the bootloader software such that a BCID in the header section of the software may be compared to the BCID stored in the bootloader 54. If the values match, then the application software and bootloader software may be deemed compatible, and the validation process can continue to the next step. If the two values do not match, then the application software may be deemed incompatible with the ECU 12 and the G-SCAAT 20 may be correspondingly deemed invalid.

Block 96 may be reached to perform a newness validation of the G-SCAAT 20 if the BCID matches either one of the stored value or the default value, else the G-SCAAT 20 may be determined to be invalid in Block 98. The newness validation 96 may correspond with determining whether a G-SCAAT flag stored on the ECU 12 has been set to a false value, an option bit included as part of the G-SCAAT 20 has been set to a first value, and a G-SCAAT creation count included as part of the G-SCAAT 20 is greater than an ECU creation count stored on the ECU 12. The creation count may be a free running counter value set at the time of the back office creating the G-SCAAT 20. The ECU 12 may be configured to determine the ECU creation counter by receiving a corresponding value as a part of the seed-based request-response strategy used to install the G-SCAAT 20.

Block 102 may be reached to perform an expiration validation of the G-SCAAT 20 if either of the false or first values are determined or the G-SCAAT creation count is greater than the ECU creation count, else the G-SCAAT may be determined to be invalid in Block 98. The expiration validation 102 may correspond with determining whether a G-SCAAT expiration count included as part of the G-SCAAT 20 is less than a back office G-SCAAT expiration count transmitted to the ECU 12 as part of the expiration validation. As opposed to being free running counter, the expiration count may be based on common or preset counter, e.g., a calendar date.

Figure 5:
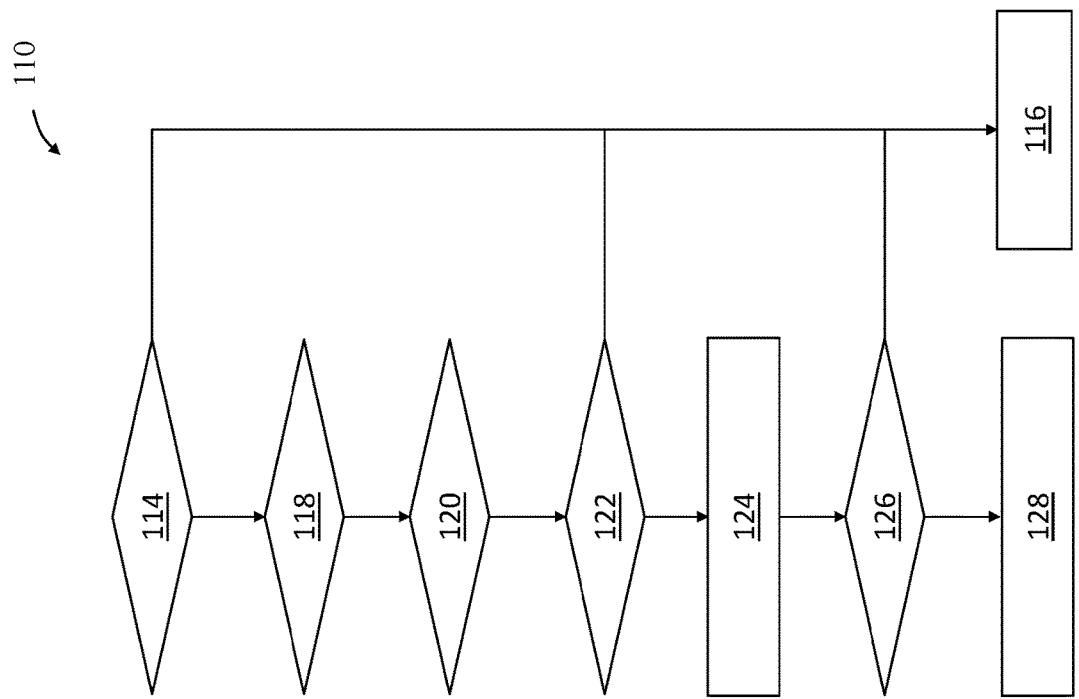
FIG. 5 illustrates a flowchart for a second validation process in accordance with one non-limiting aspect of the present disclosure.

Block 106 may relate to the first validation process determining the G-SCAAT to be valid if the G-SCAAT expiration count is less than the back office expiration count, else the G-SCAAT may be determined to be invalid in Block 98. FIG. 5 illustrates a flowchart 110 for the second validation process 80 that may occur after the G-SCAAT 20 is determined to be valid in Block 106.

Block 114 may relate a lifecycle validation for determining the G-SCAAT 20 to be invalid in Block 116 based on a non-reversible, decrementing counter, such as a manufacturing enable counter (MEC). The MEC may be configured to irreversibly count down from a selected value to 0x00 whereupon the 0x00 comes irreversible. Such a MEC may be decremented based on days, etc. such that Block 114 may determine the G-SCAAT 20 to be invalid when the MEC is zero and an option bit included as part of the G-SCAAT 20 is set to a second value, else proceeding to Block 118. This may be useful, for example, in setting the MEC to a lifecycle of the vehicle, such as to limit valid G-SCAATs to those created for a factory support whereby the MEC can be correspondingly set to expire prior to the vehicle being sold to a customer.

Block 118 may relate an additional lifecycle validation for determining the G-SCAAT 20 to be invalid in Block 116 if the MEC if greater than zero and an option bit is set to a third value, else proceeding to Block 120. This may be useful, for example, to limit valid G-SCAATs 20 to those scheduled for post-sales activities, i.e., setting the MEC to define validity according to post-manufacturing activities. The second and third values may be used in this manner to facilitate determining how the MEC influences validation, e.g., the second value can be set when it desired for the MAC to be greater than zero in order to have a valid G-SCAAT 20 and the third value can be set when it is desired for the MAC to be zero in order to have a valid G-SCAAT 20. The ability to set the corresponding parameters with related values included in the G-SCAAT 20 may be beneficial in enabling the back office 16 to limit the scope and duration of G-SCAATs 20 according to desired events.

Block 120 may relate an ignition cycle validation for determining the G-SCAAT 20 to be invalid in Block 116 if a G-SCAAT ignition count specified the G-SCAAT is greater than zero and an ECU ignition count associated with the ECU is zero, else proceeding to Block 122. The ignition count may be a non-reversible, decrementing counter set according to ignition cycles of the host device (e.g., vehicle) such that the G-SCAAT 20 may be deemed to be invalid if the G-SCAAT specifies greater than zero ignition count while the current ignition count of the vehicle, i.e., the count registered with the ECU, is zero. This validation, for example, may be useful in preventing use of a G-SCAAT 20 other than during situations when the ignition count is greater than zero.

Block 122 may relate an additional temporal validation for determining the G-SCAAT 20 to be invalid in Block 116 if a Not Before Identifier (NBID) included as part of the G-SCAAT 20 is greater than an ECU NBID associated with the ECU 12, else proceeding to Block 124.

Block 124 may correspond with the ECU 12 generating a message authentication code (MAC) for the G-SCAAT 20. The ECU 12 may be configured to generate the ECU MAC by signing the G-SCAAT 20 with a shared secret. Block 126 may relate a cryptographic validation for determining the G-SCAAT 20 to be invalid in Block 116 if the ECU MAC fails to match a G-SCAAT MAC, else proceeding to Block 128. The back office 16 may be configured to generate the G-SCAAT MAC by signing the G-SCAAT 20 with the shared secret.

Block 128 may relate to the second validation process determining the G-SCAAT 20 to be valid. FIG. 6 illustrates a flowchart 170 for the third validation process 86 that may occur after the G-SCAAT 20 is determined to be valid.

Block 172 relates to a programming process for setting values and flags on the ECU 12 to permit the programming tool 14 access to the tunable implementation memory 72, i.e., to enable user to adjust tunable values stored in the tunable implementation memory 72. The programming process 172 may include setting a new G-SCAAT value to false, changing the ECU creation count value stored in the ECU to the G-SCAAT creation count included as part of the G-SCAAT 20, setting SBI unlock levels for the ECU 12 to match unlock levels specified in the G-SCAAT 20, and setting SBI security controls for the ECU 12 to match securities controls included as part of the G-SCAAT 20. Block 172 may optionally include selecting a password that may be required to be provided to the ECU 12 for comparison to a stored value, e.g., a hash, whereupon a match would permit programming the tunable implementation memory 72 with the new values and a failure to match would result in an invalidity determination.

Block 174 relates to unlocking one or more portions of the tunable implementation memory 72 according to permissions specified in the G-SCAAT 20. The permissions may be delineated according to module IDs or other memory partition identifiers sufficient for limiting adjustments of the tunable implementation memory 72 to specifically and individually identify tunable values indicated in the G-SCAAT 20, i.e., limiting the performance tuning to tunable calibration parameters identified in the G-SCAAT 20. Block 176 relates to finally identifying the G-SCAAT 20 as valid and receiving performance tuning inputs from the programming tool 14, i.e., receiving the tunable values desired by a user for the performance tuning. The inputting of the tunable values in this manner may correspond with bypassing the authenticity check due to the corresponding portions of the tunable implementation memory 72 being alterable without requiring a digital signature of the values being input.

Figure 7:
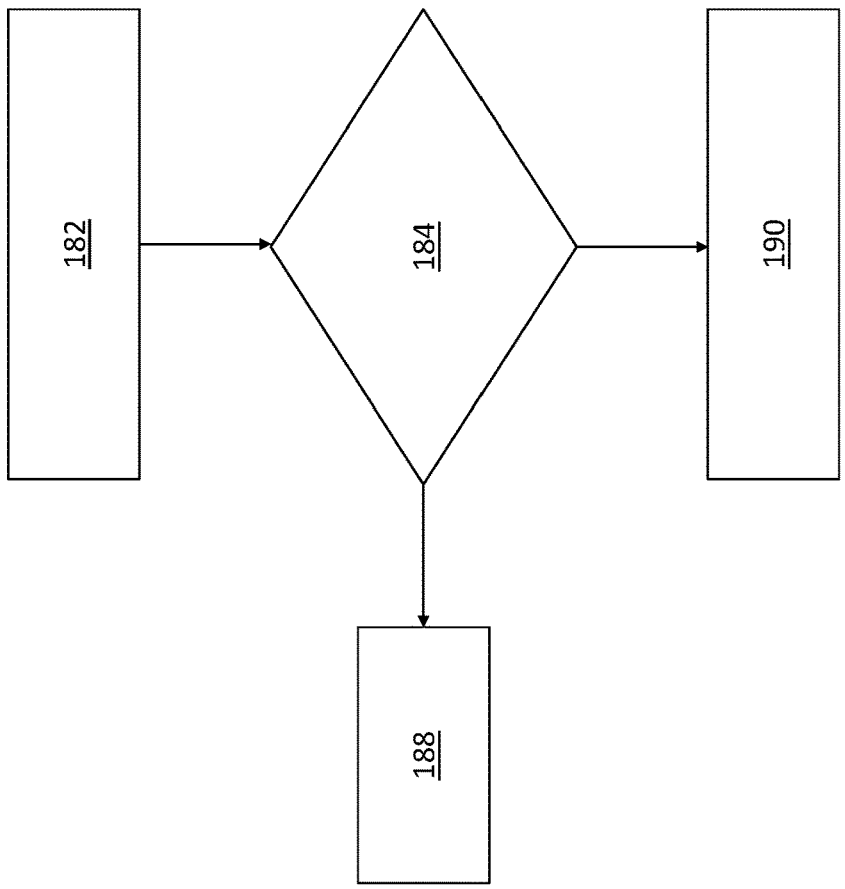
FIG. 7 illustrates a flowchart for a performance tuning process in accordance with one non-limiting aspect of the present disclosure.

FIG. 7 illustrates a flowchart 180 for a performance tuning process in accordance with one non-limiting aspect of the present disclosure. The performance tuning process may correspond with activities associated with the performance tuning noted in Block 176 of FIG. 6.

Block 182 relates to a tunable value selection process for determining one or more tunable values stored on the tunable implementation memory 72. The tunable values may correspond with values entered using the programming tool 14 to the portions of the tunable implementation memory 72 corresponding opened according to the module IDs specified in the valid G-SCAAT 20. The G-SCAAT 20 can be used in this manner to identify each one or more of the tunable module IDs available to a particular user for performance tuning. The G-SCAAT 20 may corresponding limit portions of the memory 72 capable of being altered using the programming tool 14 to pre-selected module IDs determined at the time of G-SCAAT creation. The host device OEM or other entity tasked with assuring operability of the ECU 12 may specify the corresponding permissions such that the tunable values may be identified on a user-by-user and/or an ECU-by-ECU basis according to the G-SCAAT 20 assigned to the corresponding user and/or ECU. The originator of the G-SCAAT 20 may be tasked with identifying the user and otherwise selecting the permissions included in the G-SCAAT 20 for purposes of identifying the tunable module IDs, and thereby the calibration parameters available for performance tuning.

As shown in FIG. 2, the tunable implementation memory 72 may be separately identifiable from and include a plurality of calibration parameters identical to the calibration parameters included within the calibration memory 60. The calibration data in each of the tunable implementation memory 72 and the calibration memory 60 may be initially programmed with the same factory calibration values. The tunable implementation memory 72 may be considered in this regard, at least initially, as a backup or duplicate of the calibration memory 60. The tunable implementation and calibration memories 60, 72 may be configured in this manner at the time of manufacturing the ECU 12. The calibration and tunable implementation memories 60, 72 may thereby match at the time of the ECU 12 leaving the factory of the ECU OEM and/or the host device OEM. The performance tuning may correspond with the programming tool 14 changing one or more of the tunable values in the tunable implementation memory 72. The corresponding memory access may be limited to the module IDs noted in the G-SCAAT 20, i.e., the partitions of the tunable implementation memory 72 for each calibration module ID permitted/entitled to be tunable may be identified within the G-SCAAT 20.

Block 184 relates to a tunable validation process for determining the tunable values to be one of valid and invalid. The tunable values input to the tunable implementation memory 72 may be determined to be valid if within limits specified in a tunable constraint memory 186 (FIG. 2), else the tunable values may be determined to be invalid. As shown in FIG. 2, the tunable constraint memory 186 may be separately identifiable from the tunable implementation and calibration memories 60, 72.

The tunable constraint memory 186 may be configured at the time of manufacture of the ECU 12 such that the limits therein may be selected by the OEM of the host device according to maximum values or ranges deemed for suitable operation of the ECU 12. These limits may deviate from the nominal or media calibration values included in the calibration memory 60. The limits, as such, may be set based on the overall awareness of the OEM as to how much adjustment can be properly made while still accounting for corresponding influences on the host device and/or other dependent systems. The performance tuning, thereby, may correspond with a user adjusting the tunable values included in the tunable implementation memory 72, and thereafter, the bootloader 54 determining whether those adjusted values are within limits specified within the tunable constraint memory 186.

Block 188 may relate to issuing a negative response code (NRC) from the ECU 12 to the programming tool 14 when the tunable values are determined to be invalid. The NRC may be used to appraise the user attempting the performance tuning that the the inputted tunable values are beyond acceptable ranges, i.e., beyond the limits specified in the tunable constraint memory 186, which may optionally include detail on how far the limits have been exceeded. The changes made to the tunable implementation memory 72 may optionally be automatically erased or reset to the factory settings upon determining the input values to be invalid, with the application software being configured to execute according to the calibration data stored on the calibration memory 60 until valid tunable values are determined.

Block 190 relates to controlling the application software to execute according to the tunable calibration data stored on the tunable implementation memory 72 if both of the tunable values and the G-SCAAT 20 are valid. The corresponding influence on the application software, i.e., the influences induced according to the changes in the tunable values, may persist until the ECU 12 is powered off or otherwise re-initialized, at which point the tunable implementation memory 72 may be reset to the factory settings. The foregoing process may thereafter be repeated each time the ECU 12 is powered on such that the performance tuning may again occur upon determining the tunable values and the G-SCAAT 20 to be valid. The foregoing describes an exemplary sequence for performing validation testing of the tunable values and the G-SCAAT 20 as the present disclosure fully contemplates any number of other validation processes being undertaken, including undertaking more or less testing and testing according to different sequences.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for performance tuning an electronic control unit (ECU) comprising:
   determining one or more tunable values stored on a tunable implementation memory of the ECU, the tunable values specifying tunable calibration data for performance tuning;
   determining the tunable values to be one of valid and invalid;
   determining a granular security control adjustment authorization ticket (G-SCAAT) stored on the ECU to be one of valid and invalid;
   controlling an application software of the ECU to execute according to the tunable calibration data stored on the tunable implementation memory if both of the tunable values and the G-SCAAT are valid;
   controlling the application software to execute independently of the tunable calibration data according to factory calibration data stored on a calibration memory of the ECU if either one of the tunable values and the G-SCAAT are invalid; and
   determining the tunable values be valid if within limits specified in a tunable constraint memory of the ECU, else determining the tunable values to be invalid.

2. The method according to claim 1 further comprising determining the tunable values as a function of information input to a programming tool, the programming tool configured to interface the ECU with a user and store the tunable values on the tunable implementation memory.

3. The method according to claim 2 further comprising transmitting a negative response code (NRC) from the ECU to the programming tool when the tunable values are determined to be invalid.

4. The method according to claim 2 further comprising selecting the tunable calibration data available for the performance tuning according one or more entitlements specified in the G-SCAAT.

5. The method according to claim 2 further comprising determining the G-SCAAT to be invalid in response to the G-SCAAT expiring and/or having been erased.

6. The method according to claim 2 further comprising determining the G-SCAAT to be invalid in response to an option bit included as a part of the G-SCAAT being set to a first value.

7. The method according to claim 2 further comprising determining the G-SCAAT to be invalid in response to a G-SCAAT creation count included as part of the G-SCAAT failing to be greater than a back office creation count transmitted from a back office to the ECU, the G-SCAAT creation count being a free running value.

8. The method according to claim 2 further comprising determining the G-SCAAT to be invalid in response to a G-SCAAT expiration count included as part of the G-SCAAT failing to be less than a back office expiration count transmitted from a back office to the ECU, the G-SCAAT expiration count being a predefined value.

9. The method according to claim 2 further comprising determining the G-SCAAT to be invalid in response to a manufacturing enable counter (MEC) of the ECU being zero and an option bit included as part of the G-SCAAT being set to a second value.

10. The method according to claim 2 further comprising determining the G-SCAAT to be invalid in response to a manufacturing enable counter (MEC) of the ECU being greater than zero and an option bit being set to a third value.

11. The method according to claim 2 further comprising determining the G-SCAAT to be invalid in response to a G-SCAAT ignition count included as part of the G-SCAAT being greater than zero and an ECU ignition count of the ECU being 0.

12. The method according to claim 2 further comprising determining the G-SCAAT to be invalid in response to a Not Before Identifier (NBID) included as part of the G-SCAAT being greater than an ECU NBID of the ECU.

13. The method according to claim 2 further comprising determining the G-SCAAT to be invalid in response to an ECU message authentication code (MAC) failing to match a G-SCAAT MAC, the ECU generating the ECU MAC by signing the G-SCAAT with a shared secret, a back office generating the G-SCAAT MAC by signing the G-SCAAT with the shared secret.

14. The method according to claim 2 further comprising bypassing an authenticity check to program the tunable values for storage on the tunable implementation memory, the authenticity check being required to change or re-program the factory calibration data stored on the calibration memory.

15. The method according to claim 1 further comprising resetting the tunable values to factory settings specified for the tunable calibration data in response to a re-initialization of the ECU, the factory settings matching the factory calibration data.

16. The method according to claim 1 further comprising the tunable implementation memory, the tunable constraint memory, and the calibration memory corresponding with separately identifiable partitions of a normal memory of the ECU, with each of the partitions being identifiable with a corresponding module or partition identifier.

17. A method for performance tuning an electronic control unit (ECU) comprising:
   programming factory settings for tunable calibration data stored within a tunable implementation memory of the ECU, the tunable implementation memory being part of a normal memory of the ECU;
   programming factory calibration data within a calibration memory of the normal memory, the calibration memory being separately identifiable from the tunable implementation memory;
   programming limits for the tunable calibration data within a tunable constraint memory of the normal memory, the tunable implementation memory and the calibration memory being separately identifiable from the tunable constraint memory;
   determining a granular security control adjustment authorization ticket (G-SCAAT) stored on a secured memory of the ECU to be one of valid and invalid;
   selecting based on entitlements specified in the G-SCAAT one or more tunable portions of the tunable calibration data to be available for performance tuning;
   re-programming one or more of the tunable portions with tunable values input via a programming tool, the tunable values differing from the factory settings programmed for the tunable calibration data associated therewith;
   determining the tunable values to be valid if within the limits specified in the tunable constraint memory, else determining the tunable values to be invalid;
   controlling an application software of the ECU to execute according to the tunable calibration data stored on the tunable implementation memory if both of the tunable values and the G-SCAAT are valid; and
   controlling the application software to execute independently of the tunable calibration data according to the factory calibration data stored on the calibration memory if either one of the tunable values and the G-SCAAT are invalid.

* * * * *